(12) United States Patent
Seelert et al.

(10) Patent No.: US 6,197,900 B1
(45) Date of Patent: *Mar. 6, 2001

(54) PREPARATION OF MULTIPHASE HOMO- OR COPOLYMERS OF $C_2$-$C_{10}$-ALK-1-ENES IN ONE REACTION ZONE

(75) Inventors: Stefan Seelert, Frankenthal; Franz Langhauser, Bad Dürkheim; Jürgen Kerth, Carlsberg; Patrik Müller, Kaiserslautern; David Fischer, Gönnheim; Günther Schweier, Friedelsheim, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,701

(22) Filed: May 2, 1997

Related U.S. Application Data

(63) Continuation of application No. 08/620,223, filed on Mar. 22, 1996, now abandoned, which is a continuation of application No. 08/513,310, filed on Aug. 10, 1995, now abandoned, which is a continuation of application No. 08/303,490, filed on Sep. 9, 1994, now abandoned.

(30) Foreign Application Priority Data

Sep. 10, 1993 (DE) .................................. 43 30 667

(51) Int. Cl.⁷ ....................................... C08F 4/44
(52) U.S. Cl. .................. 526/114; 526/116; 526/119; 526/160; 526/348.2; 526/348.3; 526/348.4; 526/348.5; 526/348.6; 526/351; 526/352; 526/943
(58) Field of Search .................... 526/114, 116, 526/119, 160, 348.2, 348.3, 348.4, 348.5, 348.6, 351, 352, 943

(56) References Cited

U.S. PATENT DOCUMENTS 4,857,613 * 8/1989 Zolk et al. ................. 526/128

FOREIGN PATENT DOCUMENTS 40 04 087  8/1991 (DE) .

(List continued on next page.)

OTHER PUBLICATIONS

Kaminsky, "Metallocene Catalysts", SP'92–Polyethylene World Congress, pp 3.1–3.21, Dec. 1992.*

(List continued on next page.)

Primary Examiner—Bernard Lipman
(74) Attorney, Agent, or Firm—Keil & Weinkauf

(57) ABSTRACT

Multiphase homo- or copolymers of $C_2$–$C_{10}$-alk-1-enes are prepared by a process in which polymerization is effected in the presence of two different catalyst systems in one reaction zone, one of the catalyst systems containing, as active components, a metallocene complex of the general formula (I) or (II)

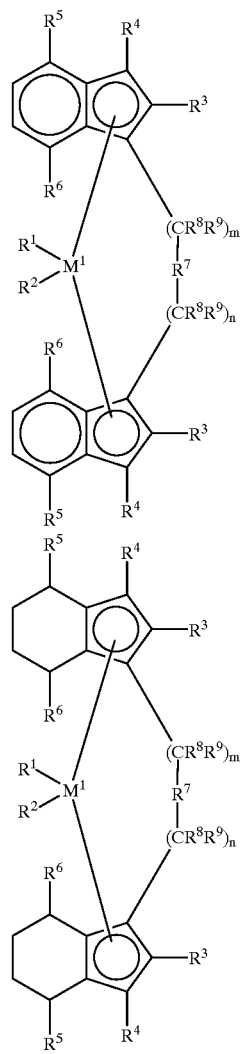

where
$M^1$ is a metal of group IVb, Vb or VIb of the Periodic Table,
$R^1$ and $R^2$ are identical or different and are each hydrogen, $C_1$–$C_{10}$-alkyl, $C_1$–$C_{10}$-alkoxy, $C_6$–$C_{10}$-aryl, $C_6$–$C_{10}$-aryloxy, $C_2$–$C_{10}$-alkenyl, $C_7$–$C_{40}$-arylalkyl, $C_7$–$C_{40}$-alkylaryl, $C_8$–$C_{40}$-arylalkenyl or halogen,
$R^3$ and $R^4$ are identical or different and are each hydrogen, halogen, $C_1$–$C_{10}$-alkyl which may be halogenated, $C_6$–$C_{10}$-aryl or an —$NR_2^{10}$, —$SR^{10}$, —$OSiR_3^{10}$, —$SiR_3^{10}$ or —$PR_2^{10}$ radical, where $R^{10}$ is halogen, $C_1$–$C_{10}$-alkyl or $C_6$–$C_{10}$-aryl, and
$R^5$ and $R^6$ are identical or different and have the meanings stated for $R^3$ and $R^4$, with the proviso that $R^5$ and $R^6$ are not hydrogen.

8 Claims, No Drawings

U.S. PATENT DOCUMENTS

| | | | | |
|---|---|---|---|---|
| 4,935,474 | * | 6/1990 | Ewen et al | 526/114 |
| 4,939,217 | * | 7/1990 | Stricklen | 526/114 |
| 5,032,562 | * | 7/1991 | Lo et al. | 502/111 |
| 5,124,418 | * | 6/1992 | Welborn, Jr. | 526/114 |
| 5,145,818 | * | 9/1992 | Tsutsui et al. | 502/113 |
| 5,171,799 | * | 12/1992 | Kioka et al. | 526/127 |
| 5,182,341 | * | 1/1993 | Masino | 526/125 |
| 5,350,817 | * | 9/1994 | Winter et al. | 526/119 |

FOREIGN PATENT DOCUMENTS

| | | |
|---|---|---|
| 40 19 453 | 1/1992 | (DE) . |
| 439 964 | 8/1991 | (EP) . |
| 536 104 | 4/1993 | (EP) . |
| 92/15619 | 9/1992 | (WO) . |

OTHER PUBLICATIONS

Fahey, "Metallocene Catalysts: A revolution in Olefin Polymrization", PTO presentation, pp 237, Nov. 1995.*

* cited by examiner

PREPARATION OF MULTIPHASE HOMO- OR COPOLYMERS OF $C_2$-$C_{10}$-ALK-1-ENES IN ONE REACTION ZONE

This application is a continuation of application Ser. No. 08/620,223, filed on Mar. 22, 1996 now abandoned, which is a continuation of application Ser. No. 08/513,310, filed on Aug. 10, 1995 now abandoned, which is a continuation of application Ser. No. 08/303,490, filed on Sep. 9, 1994 now abandoned.

The present invention relates to a process for the preparation of multiphase homo- or copolymers of $C_2$–$C_{10}$-alk-1-enes.

The present invention furthermore relates to the use of the homo- or copolymers, obtained by the novel process, for the production of films, fibers or moldings.

Multiphase homo- or copolymers of $C_2$–$C_{10}$-alk-1-enes are usually prepared by a multistage polymerization process, the polymer obtained in a first reaction zone initially being transferred to a second reaction zone, where a mixture of one or more $C_2$–$C_{10}$-alk-1-enes is polymerized with it. In this way, a mixture of two different polymers forms in the second reaction zone. Under certain circumstances, the mixture obtained from the second polymerization zone may furthermore be introduced into one or more further reaction zones, where other $C_2$–$C_{10}$-alk-1-enes are polymerized with it. (DE-A 40 04 087, DE-A 40 19 453).

The conventional processes are relatively complicated in terms of process engineering since, on the one hand, the reactor conditions in the individual reaction zones must be matched with one another and, on the other hand, the transfer of polymers from one reaction zone to the other is associated with certain difficulties with regard to regulations. Moreover, such multistage processes always require a very expensive apparatus, entailing considerable capital costs.

It is an object of the present invention to remedy the disadvantages described and to provide a process for the preparation of multiphase homo- or copolymers of $C_2$–$C_{10}$-alk-1-enes which is less complicated in terms of process engineering.

We have found that this object is achieved by a process for the preparation of multiphase homo- or copolymers of $C_2$–$C_{10}$-alk-1-enes, wherein polymerization is carried out in the presence of two different catalyst systems in one reaction zone, one of the catalyst systems containing, as active components, a metallocene complex of the general formula (I) or (II)

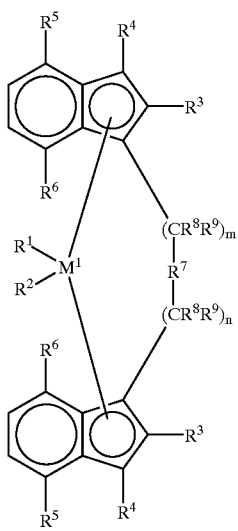

(I)

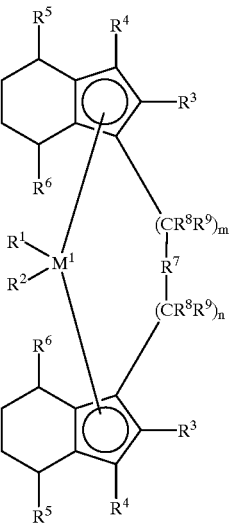

(II)

where
$M^1$ is a metal of group IVb, Vb or VIb of the Periodic Table,
$R^1$ and $R^2$ are identical or different and are each hydrogen, $C_1$–$C_{10}$-alkyl, $C_1$–$C_{10}$-alkoxy, $C_6$–$C_{10}$-aryl, $C_6$–$C_{10}$-aryloxy, $C_2$–$C_{10}$-alkenyl, $C_7$–$C_{40}$-arylalkyl, $C_7$–$C_{40}$-alkylaryl, $C_8$–$C_{40}$-arylalkenyl or halogen,
$R^3$ and $R^4$ are identical or different and are each hydrogen, halogen, $C_1$–$C_{10}$-alkyl which may be halogenated, $C_6$–$C_{10}$-aryl or an $-NR_2^{10}$, $-SR^{10}$, $-OSiR_3^{10}$, $-SiR_3^{10}$ or $-PR_2^{10}$ radical, where $R^{10}$ is halogen, $C_1$–$C_{10}$-alkyl or $C_6$–$C_{10}$-aryl,
$R^5$ and $R^6$ are identical or different and have the meanings stated for $R^3$ and $R^4$, with the proviso that $R^5$ and $R^6$ are not hydrogen,
$R^7$ is

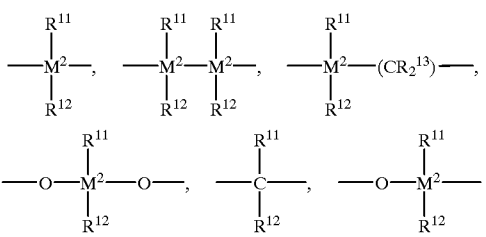

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P-(O)R^{11}$,
where
$R^{11}$, $R^{12}$ and $R^{13}$ are identical or different and are each hydrogen, halogen, $C_1$–$C_{10}$-alkyl, $C_1$–$C_{10}$-fluoroalkyl, $C_6$–$C_{10}$-aryl, $C_6$–$C_{10}$-fluoroaryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or $R^{11}$ and $R^{12}$ or $R^{11}$ and $R^{13}$ each form a ring together with the atoms linking them,
$M^2$ is silicon, germanium or tin,
$R^8$ and $R^9$ are identical or different and have the meanings stated for $R^{11}$ and
m and n are identical or different and are each zero, 1 or 2, m plus n being zero, 1 or 2, and an oligomeric aluminum oxide compound.

Alkyl is straight-chain or branched alkyl, halogen (halogenated) is fluorine, chlorine, bromine or iodine, preferably fluorine or chlorine.

The novel process is used for the preparation of multiphase homo- or copolymers of $C_2$–$C_{10}$-alk-1-enes, in particular of $C_2$–$C_6$-alk-1-enes. Particularly preferred $C_2$–$C_6$-alk-1-enes are ethylene, propylene, but-1-ene, pent-1-ene and hex-1-ene. The term multiphase homo- or copolymers of $C_2$–$C_{10}$-alk-1-enes is intended to mean not only three-phase and four-phase mixtures but also in particular two-phase mixtures of homo- or copolymers of these $C_2$–$C_{10}$-alk-1-enes. Examples of particularly preferred two-phase mixtures include copolymers of ethylene or of propylene with other copolymers of ethylene or of propylene, and minor amounts, ie. up to 40, in particular up to 30, % by weight of further $C_2$–$C_6$-alk-1-enes, for example propylene, ethylene, but-1-ene, pent-1-ene or hex-1-ene, may also be present in the copolymers. Other preferred two-phase mixtures include two different homopolymers of propylene or other $C_2$–$C_6$-alk-1-enes, or a homopolymer of ethylene or propylene with a copolymer of ethylene or propylene with minor amounts, ie. up to 40, in particular up to 30, % by weight of further $C_2$–$C_6$-alk-1-enes.

On the one hand, Ziegler-Natta catalyst systems may be used as catalyst systems in the novel process.

Ziegler-Natta catalyst systems contain, inter alia, a cocatalyst in addition to a titanium-containing solid component. A suitable cocatalyst is an aluminum compound. An electron donor compound is preferably used as a further component of the cocatalyst, in addition to this aluminum compound. The polymerization is carried out in the reactors usually used in industry for polymerization reactions, preferably in the gas phase.

For the preparation of the titanium-containing solid component, the titanium compounds used are in particular halides or alcoholates of trivalent or tetravalent titanium, the chlorides of titanium, in particular titanium tetrachloride, being preferred. The titanium-containing solid component advantageously contains a finely divided carrier, silicas and aluminas as well as aluminum silicates of the empirical formula $SiO_2.aAl_2O_3$, where a is from 0.001 to 2, in particular from 0.01 to 0.5, having proven useful for this purpose. Further carriers include finely divided polyolefins, for example finely divided polypropylene.

Inter alia, compounds of magnesium are also used in the preparation of the titanium-containing solid component. Particularly suitable compounds of this type are magnesium halides, alkylmagnesiums and arylmagnesiums, as well as alkoxymagnesium and aryloxymagnesium compounds, magnesium chloride, magnesium bromide and di-$C_1$–$C_{10}$-alkylmagnesium compounds being preferably used. The titanium-containing solid component may also contain halogen, preferably chlorine or bromine.

The titanium-containing solid component furthermore contains electron donor compounds, for example mono- or polyfunctional carboxylic acids, carboxylic anhydrides and carboxylic esters, and ketones, ethers, alcohols, lactones and organophosphorus and organosilicon compounds. Preferably used electron donor compounds within the titanium-containing solid component are phthalic acid derivatives of the general formula III

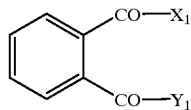

III where $X_1$ and $Y_1$ are each chlorine or $C_1$–$C_{10}$-alkoxy or together are oxygen. Particularly preferred electron donor compounds are phthalic esters where $X_1$ and $Y_1$ are each $C_1$–$C_8$-alkoxy, for example methoxy, ethoxy, propoxy or butoxy.

Further preferred electron donor compounds within the titanium-containing solid components include diesters of 3-membered or 4-membered, unsubstituted or substituted cycloalkane-1,2-dicarboxylic acids and monoesters of unsubstituted or substituted benzophenone-2–Carboxylic acids.

The alcohols usually used in esterification reactions, including $C_1$–$C_{15}$-alkanols, $C_5$–$C_7$–Cycloalkanols, which in turn may carry $C_1$–$C_{10}$-alkyl groups, and $C_6$–$C_{10}$-phenols are used as hydroxy compounds in the case of these esters.

The titanium-containing solid component can be prepared by methods known per se. Examples of these are described, inter alia, in EP-A 45 975, EP-A 45 977, EP-A 86 473, EP-A 171 200, GB-A 2 111 066 and U.S. Pat. No. 4,857,613.

The titanium-containing solid component obtainable thereby is used with cocatalysts as a Ziegler-Natta catalyst system. Suitable cocatalysts are aluminum compounds and further electron donor compounds.

Aluminum compounds which are suitable cocatalysts are trialkylaluminum as well as compounds in which an alkyl group has been replaced by an alkoxy group or by a halogen atom, for example by chlorine or bromine. Trialkylaluminum compounds whose alkyl groups are each of 1 to 8 carbon atoms, for example trimethyl-, triethyl- or methyldiethylaluminum, are preferably used.

In addition to the aluminum compound, electron donor compounds, for example mono- or polyfunctional carboxylic acids, carboxylic anhydrides and carboxylic esters, and ketones, ethers, alcohols, lactones and organophosphorus and organosilicon compounds, are also preferably used as further cocatalysts. Preferred electron donor compounds are organosilicon compounds of the general formula IV

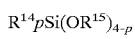

IV where
the radicals $R^{14}$ are identical or different and are each $C_1$–$C_{20}$-alkyl, a 5-membered to 7-membered cycloalkyl, which in turn may carry a $C_1$–$C_{10}$-alkyl group, or $C_6$–$C_{20}$-aryl or arylalkyl, the radicals $R^{15}$ are identical or different and are each $C_1$–$C_{20}$-alkyl and p is 1, 2 or 3. Particularly preferred compounds are those in which $R^{14}$ is $C_1$–$C_8$-alkyl or 5-membered to 7-membered cycloalkyl, $R^{15}$ is $C_1$–$C_4$-alkyl and p is 1 or 2.

Among these compounds, dimethoxydiisopropylsilane, dimethoxyisobutylisopropylsilane, dimethoxydiisobutylsilane, dimethoxydicyclopentylsilane, diethoxyisobutylisopropylsilane and dimethoxyisopropyl-sec-butylsilane are particularly noteworthy.

Preferably used catalyst systems are those in which the atomic ratio of aluminum from the aluminum compound to titanium from the titanium-containing solid component is from 10:1 to 800:1, in particular from 20:1 to 200:1, and the molar ratio of the aluminum compound to the electron donor compound used as the cocatalyst is from 1:1 to 100:1, in particular from 2:1 to 80:1. The individual catalyst components may be introduced into the polymerization system individually in any order or as a mixture of two components.

In the novel process, catalyst systems which contain, as active components of the general formulae (I) and (II), different metallocene complexes of metals of subgroups IV and V of the Periodic Table and oligomeric aluminum oxide compounds may furthermore be used instead of the Zieler-Natta catalyst systems. Metallocene complexes of titanium, zirconium, hafnium, vanadium, niobium or tantalum are preferred.

Preferably used complexes are those in which the metal atom is bonded via π bonds to unsaturated cyclic hydrocarbon radicals, for example cyclopentadienyl, fluorenyl or indenyl. Furthermore, in the preferably used complexes, the metal atom may also be bonded to further ligands, in particular to fluorine, chlorine, bromine or iodine or to $C_1$–$C_{10}$-alkyl, for example methyl, ethyl, propyl or butyl.

Particularly suitable metallocene complexes are of the general formula V

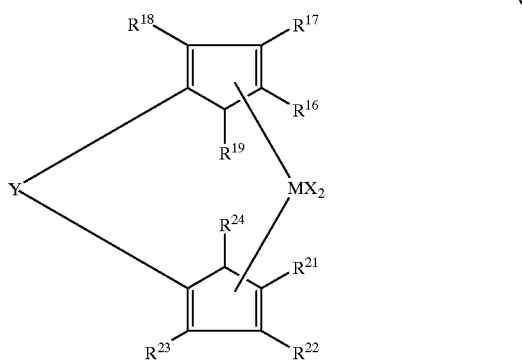

where
M is titanium, zirconium, hafnium, vanadium, niobium or tantalum,
X is fluorine, chlorine, bromine, iodine, hydrogen, $C_1$–$C_{10}$-alkyl, $C_6$–$C_{15}$-aryl or —$OR^{20}$,
where $R^{20}$ is $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical,
$R^{16}$ to $R^{19}$ and $R^{21}$ to $R^{24}$ are each hydrogen, $C_1$–$C_{10}$-alkyl, 5-membered to 7-membered cycloalkyl, which in turn may carry $C_1$–$C_{10}$-alkyl radicals as substituents, $C_6$–$C_{15}$-aryl or arylalkyl, it being possible for two adjacent radicals together to be a cyclic saturated, partly saturated or unsaturated group of 4 to 15 carbon atoms, or $Si(R^{25})_3$,
where
$R^{25}$ is $C_1$–$C_{10}$-alkyl, $C_6$–$C_{15}$-aryl or $C_3$–$C_{10}$-cycloalkyl, and

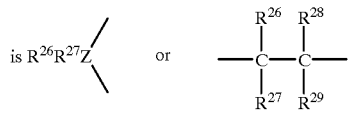

where Z is silicon, germanium, tin or carbon, and
$R^{26}$, $R^{27}$, $R^{28}$ and $R^{29}$ are each hydrogen, $C_1$–$C_{10}$-alkyl, $C_3$–$C_{10}$-cycloalkyl or $C_6$–$C_{15}$-aryl, it being possible for two adjacent radicals together to be a cyclic group of 4 to 15 carbon atoms.

Particularly suitable compounds of the formula V are those in which $R^{16}$ and $R^{21}$ are identical and are each hydrogen or $C_1$–$C_{10}$-alkyl,
$R^{19}$ and $R^{24}$ are identical and are each hydrogen, methyl, ethyl, isopropyl or tert-butyl,
$R^{18}$ and $R^{23}$ are each $C_1$–$C_4$-alkyl,
$R^{17}$ and $R^{22}$ are each hydrogen
or two adjacent radicals $R^{17}$ and $R^{18}$ or $R^{22}$ and
$R^{23}$ together are a cyclic group of 4 to 12 carbon atoms,
$R^{26}$, $R^{27}$, $R^{28}$ and $R^{29}$ are each hydrogen or $C_1$–$C_8$-alkyl,
M is zirconium or hafnium and
X is chlorine.

Examples of particularly suitable complexes include dimethylsilanediylbis(cyclopentadienyl)zirconium dichloride, dimethylsilanediylbis(indenyl)zirconium dichloride, dimethylsilanediylbis(tetrahydroindenyl) zirconium dichloride, ethylenebis(cyclopentadienyl) zirconium dichloride, ethylenebis(indenyl)zirconium dichloride, ethylenebis(tetrahydroindenyl)zirconium dichloride, ethylenebis(2-methylindenyl)zirconium dichloride, ethylenebis(2-methylindenyl)hafnium dichloride, ethylenebis(2-methylbenzindenyl)zirconium dichloride, ethylenebis(2-methylbenzindenyl)hafnium dichloride, dimethylsilanediylbis(3-tert-butyl-5-methylcyclopentadienyl)zirconium dichloride, dimethylsilanediylbis(3-tert-butyl-5-ethylcyclopentadienyl) zirconium dichloride, dimethylsilanediylbis(3-tert-butyl-5-methylcyclopentadienyl)dimethylzirconium, dimethylsilanediylbis(2-methylindenyl)zirconium dichloride, dimethylsilanediylbis(2-isopropylindenyl) zirconium dichloride, dimethylsilanediylbis(2-tert-butylindenyl)zirconium dichloride, diethylsilanediylbis(2-methylindenyl)zirconium dibromide, dimethylsilanediylbis (2-methyl-5-methylcyclopentadienyl)zirconium dichloride, dimethylsilanediylbis(2-ethyl-5-isopropylcyclopentadienyl) zirconium dichloride, dimethylsilanediylbis(2-methylbenzindenyl)zirconium dichloride, dimethylsilanediylbis(2-methylindenyl)hafnium dichloride and isopropylidenecyclopentadienylfluorenylzirconium dichloride.

The synthesis of such complexes can be carried out by methods known per se, the reaction of the correspondingly substituted, cyclic hydrocarbon anions with halides of titanium, zirconium, hafnium, vanadium, niobium or tantalum being preferred. Examples of corresponding preparation processes are described in, inter alia, J. Organometal. Chem. 369 (1989), 359–370.

The metallocene complexes may also be in cationic form, as described in EP-A 277 003 and EP-A 277 004. μ-Oxobis (chlorobiscyclopentadienyl)zirconium may also be used as the metallocene complex.

In addition to the metallocene complexes, the catalyst systems used also contain oligomeric aluminum oxide compounds. For example, open-chain or cyclic alumoxane compounds of the general formula VI or VII

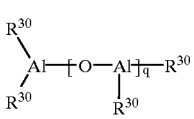

-continued

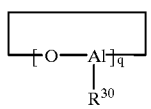
VII where $R^{30}$ is $C_1$–$C_4$-alkyl, preferably methyl or ethyl, and q is an integer from 5 to 30, preferably from 10 to 25, are suitable.

The preparation of these oligomeric alumoxane compounds is usually carried out by reacting a solution of a trialkylaluminum compound with water and is described in, inter alia, EP-A 284 708 and U.S. Pat. No. 4,794,096.

As a rule, the oligomeric alumoxane compounds obtained are in the form of mixtures of both linear and cyclic chain molecules of different lengths, so that q is to be regarded as an average value. The alumoxane compounds may also be present as a mixture with other metal alkyls, preferably with alkylaluminums.

It has proven advantageous to use the complex of metals of subgroups IV and V of the Periodic Table and the oligomeric alumoxane compound in amounts such that the atomic rato of aluminum from the oligomeric alumoxane compound to the transition metal from the complex of metals of subgroups IV and V of the Periodic Table is from 10:1 to $10^6$:1, in particular from 10:1 to $10^4$:1.

Conventional aromatic hydrocarbons, preferably of 6 to 20 carbon atoms, in particular xylene and toluene, and mixtures thereof are used as solvents for these catalyst systems.

Supported metallocene complexes may also be used. Examples of suitable carriers are silica gels, preferably those of the formula $SiO_2.aAl_2O_3$, where a is from 0 to 2, preferably from 0 to 0.5, ie. essentially aluminosilicates or silica. The carriers preferably have a particle diameter of from 1 to 200 µm, in particular from 30 to 80 µm. Such products are commercially available, for example as Silica Gel 332 from Grace.

In addition to the Ziegler-Natta catalyst system or the metallocene-containing catalyst system, a second catalyst system which contains a metallocene complex of the above-mentioned general formula (I) or (II) as an active component is also used in the novel process, which is carried out in one reaction zone.

Preferred compounds of the general formula (I) or (II) and processes for their preparation are described in, inter alia, EPA 537 686.

In addition to the metallocene complexes of the general formula (I) or (II), the second catalyst system used also contains, as active components, oligomeric aluminum oxide compounds of the above-mentioned general formula (VI) or (VII). With regard to the ratios of the active components, the statements made in connection with the other metallocene-containing catalyst systems are applicable. The metallocene complexes of the general formulae (I) and (II) can likewise be used in supported form, and the carriers used may be the same as those described above.

The novel process can be carried out in solution, in a suspension, in the gas phase or as a mass polymerization. The process for the preparation of multiphase homo- or copolymers of $C_2$–$C_{10}$-alk-1-enes is preferably carried out in the gas phase. The polymerization conditions as such are not critical; pressures of 0.5 to 3000, preferably from 1 to 80, bar and temperatures of from −50 to −300° C., preferably from −20 to 100° C., have proven suitable. The polymerization can be carried out in the presence of conventional regulators, for example hydrogen or $C_2$–$C_8$-alk-1-enes, and in conventional polymerization reactors.

In the novel process, the individual catalyst systems can be used in different ratios. The ratios preferably chosen are such that the polymer formed is composed of from 5 to 70% by weight of the homo- or copolymer obtained with the metallocene-containing catalyst system of the formula (I) or (II) and of from 30 to 95% by weight of the homo- or copolymer obtained with the other catalyst system.

With the aid of the novel process, it is possible to prepare multiphase homo- or copolymers of $C_2$–$C_{10}$-alk-1-enes using simple process engineering and without expensive apparatus. The novel process is suitable for the preparation of a very wide range of multiphase homo- or copolymers of $C_2$–$C_{10}$-alk-1-enes. These can be used for the production of films, fibers or moldings and are readily processable.

EXAMPLES

Example 1

1.1 Preparation of a carrier 56 ml of a solution of 6.4 g of triethylaluminum in 48 ml of heptane were added dropwise to a suspension of 20.2 g of silica gel (Grace, SG 332, particle diameter 20–45 µm) in 200 ml of heptane at room temperature in the course of 30 minutes. The temperature increased to 44° C. during this procedure. After stirring had been carried out for 18 hours at room temperature, the product was filtered off, washed with twice 30 ml of heptane and with twice 30 ml of pentane and then dried under reduced pressure from an oil pump.

1.2 Application of the catalyst systems to the carrier 17 ml ($\hat{=}$26 mmol) of a solution of methylalumoxane in toluene (1.53 molar, from Witco) were added to a solution of 30 ml of toluene, 40 µmol of dimethylsilanediylbis(2-methylbenzoindenyl)zirconium dichloride ($\hat{=}$23 mg) and 25 µmol of rac[1,2-ethanediylbis{1-(4,7-dimethyl-4,5,6,7-tetrahydroindenyl)}]zirconium dichloride ($\hat{=}$12 mg), and the mixture was stirred for 15 minutes. Thereafter, 5 g of the carrier prepared in 1.1 were added and stirring was continued for a further 30 minutes. Finally, the solvent was removed at room temperature in the course of 4 hours under reduced pressure from an oil pump. A free-flowing catalyst powder comprising two metallocene catalyst systems was formed.

1.3 Polymerization 20 g of polypropylene granules and 12 ml of triethylaluminum (1 molar solution in heptane) were introduced in succession into a dry 10 liter autoclave flushed with nitrogen, and stirring was carried out for 15 minutes. Thereafter, 1.5 g of the supported catalyst prepared in 1.2 were introduced into the reactor in a nitrogen countercurrent, and the reactor was closed. At a stirrer speed of 350 rpm, the mixture was heated to 70° C. and at the same time the internal pressure was gradually increased to the final pressure of 28 bar by adding propylene. Polymerization was then carried out for 1.5 hours, fresh propylene being added by automatic pressure regulation. After the end of the reaction, the pressure was let down to atmospheric pressure in the course of 10 minutes, and the polymer formed, which consisted of two different propylene homopolymers, was discharged in the stream of nitrogen. The corresponding polymerization results are listed in the table.

Example 2

2.1 Metallocene-containing catalyst system of the formula (II)

60 µmol of rac[1,2-ethanediylbis{1-(4,7-dimethyl-4,5,6,7-tetrahydroindenyl)}]zirconium dichloride ($\hat{=}$29 mg) and 16 ml of a 1.53 molar solution of methylalumoxane (=24 mmol) in toluene were used according to the process described in Example 1.2.

2.2 Ziegler-Natta catalyst system 20 g of $SiO_2$ (SG 332 from Grace, having a particle diameter of 20 to 45 µm) were suspended in 200 ml of n-heptane, and 25.33 ml of n-butyl-n-octyl magnesium were added at 20° C. The suspension was heated to the reflux temperature and kept under reflux for 30 minutes. After subsequent cooling of the suspension to room temperature, chlorination was effected with excess HCl for 2 hours, beginning at 60° C., after which 19.41 ml of ethanol were added at room temperature. The mixture was initially refluxed for 30 minutes and, after further cooling to 25° C., 17.07 ml of titanium tetrachloride were added, the mixture was then again heated to 60° C. and 2.94 ml of di-n-butyl phthalate were added at this temperature. The mixture was refluxed for one hour. The resulting suspension was filtered and the residue was washed with 160 ml of ethylbenzene. Drying gave 29.2 g of the catalyst intermediate.

The catalyst intermediate obtained was extracted in a heatable extraction frit, while stirring for 60 minutes, with a mixture of 450 ml of ethylbenzene and 50 ml of titanium tetrachloride, at a jacket temperature of 125° C. The catalyst was then washed with three times 120 ml of n-hexane and once with 120 ml of n-pentane and dried in a stream of nitrogen. The catalyst contained 2.0% by weight of magnesium.

Thereafter, the titanium-containing solid component was first subjected to a prepolymerization and then deactivated. For this purpose, 700 ml of n-heptane were initially taken in a 1 l glass autoclave provided with a stirrer, and the reaction vessel was cooled to an internal temperature of 5° C. 47.4 ml of triethylaluminum (in the form of a 1.0 molar solution in n-heptane) and 6.26 ml of dimethoxyisobutylisopropylsilane (in the form of a 1.0 molar solution in n-heptane) were added to the solvent. 20 g of the prepared titanium-containing solid component were then added. Gaseous propylene (flow rate: 40 l/h) was then passed in at 1 bar continuously with stirring via an inlet tube for one hour. During the propylene feed, the internal temperature was kept at from 5 to 20° C. After the propylene feed was complete, gaseous, dry $CO_2$ (flow rate: 14.5 l/h at 1 bar) was then passed continuously into the stirred catalyst suspension via an inlet tube for 1 hour. The catalyst suspension having polymerization activity was thus deactivated.

90 g of a solid which contained 3.1 parts by weight of polypropylene per part by weight of catalyst solid were obtained.

The resulting solid is the Ziegler-Natta catalyst system.

2.3 Polymerization

The polymerization of propylene was carried out similarly to Example 1.3 in one reaction zone in the presence of 1.3 g of the Ziegler-Natta catalyst system prepared according to Example 2.2 and 0.5 g of the metallocene-containing catalyst system described in Example 2.1. The corresponding polymerization results are listed in the table below.

Example 3

3.1 Application of the catalyst systems to the carrier

Using a process similar to that described in 1.2, 25 µmol of rac[1,2-ethanediylbis{1-(4,7-dimethyl-4,5,6,7-tetrahydroindenyl)}]zirconium dichloride (=12 mg) were dissolved in 20 ml of toluene, the solution was added to 6.5 ml (=10 mmol) of a solution of methylalumoxane in toluene (1.53 molar from Witco) and the mixture was stirred for 15 minutes. Thereafter, 5 g of the Ziegler-Natta catalyst system prepared in 2.2 were added and stirring was continued for a further 30 minutes. Finally, the solvent was removed at room temperature in the course of 4 hours under reduced pressure from an oil pump. A free-flowing catalyst powder comprising a Ziegler-Natta and a metallocene catalyst system was formed.

3.2 Polymerization

The polymerization was carried out by a process similar to that described in 1.3, using 1.5 g of the supported catalyst prepared in 3.1. The corresponding polymerization results are shown in the table.

Example 4

Using a procedure similar to that in Example 1.3, the polymerization of a mixture of propylene and ethylene was carried out in the presence of 1.5 g of the catalyst system obtained in Example 1.2, in one reaction zone and in the gas phase. The catalyst system of Example 1.2 contained both a conventional metallocene-containing catalyst system differing from the formula (II) and a metallocene-containing catalyst system of the formula (II). A gaseous mixture of 99% of propylene and 1% of ethylene was polymerized. By appropriate regulation, it was ensured that in each case the chosen gas composition was fed in.

The melting points and glass transition temperatures of the resulting polymer components A and B were determined by means of DSC measurements (10° C./1 min heating rate). For all samples, two melting points and two glass transition temperatures were found and could be assigned to the two polymer components A and B. Component B was always the polymer which formed over the metallocene-containing catalyst system of the general formula (II).

The G modulus was determined according to DIN 53 445 and the Charpy impact strength an according to DIN 53 453.

The productivities [g/g cat·h] relate to the total amount of the catalyst, ie. to the sum of the amounts of the two different catalyst systems.

Separation according to TREF (Temperature Rising Elution Fractionation) served to determine the particular proportions of the polymers A) [formed over the Ziegler-Natta catalyst system or over the metallocene-containing catalyst system which differs from that of the formula (I) or (II)] and those of the polymer B [formed over the metallocene-containing catalyst system of the formula (I) or (II)]. For this purpose, fractions were eluted from the total polymer with the aid of xylene at different, rising temperatures. The fraction obtained at 80° C. corresponded to the polymer B, the collected fraction which was eluted at 100° C. and 130° C. corresponded to the polymer A (U.S. Pat. No. 5,030,713; L. Wild, Advances in Polymer Science 98 (1990), 1–47).

TABLE

| Example | Yield [g] | Productivity [g/g cat · h] | Melting points [° C.] A) | Melting points [° C.] B) | Glass transition temperatures [° C.] A) | Glass transition temperatures [° C.] B) | G modulus |
|---|---|---|---|---|---|---|---|
| 1 | 1380 | 613 | 145 | 119 | −2 | −22 | 600 |
| 2 | 1160 | 430 | 163 | 120 | 1 | −23 | 560 |
| 3 | 1430 | 635 | 162 | 121 | 0 | −22 | 550 |
| 4 | 1460 | 648 | 139 | 116 | −3 | −24 | 510 |

TABLE-continued

| Impact strength $a_n$ [kJ/m²] | | | Separation according to TREF [% by weight] | | |
|---|---|---|---|---|---|
| at 23° C. | at 0° C. | at −20° C. | 80° C. | 100° C. | 130° C. |
| n.f. | n.f. | 40 | 23.2 | 69.8 | 7.0 |
| n.f. | n.f. | 30 | 24.0 | 46.7 | 29.3 |
| n.f. | n.f. | 35 | 26.1 | 49.3 | 24.6 |
| n.f. | n.f. | 50 | | | | n.f. . . . not fractured

We claim:

1. A process for the preparation of multiphase homopolymers of propylene, but-1-ene, pent-1-ene, hex-1-ene, or copolymers of these monomers with other $C_2$–$C_{10}$-alk-1-enes, which process comprises polymerizing propylene, but-1-ene, pent-1-ene, hex-1-ene or copolymers of these monomers with other $C_2$–$C_{10}$-alk-1-enes in the presence of a first catalyst system and a different second catalyst system in one reaction zone, wherein the first catalyst systems comprises:

as one active component, a metallocene complex of the formula (II)

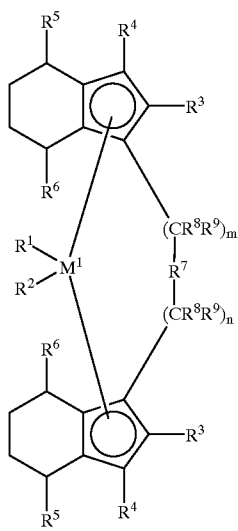

(II)

where $M^1$ is zirconium of hafnium, $R^1$ and $R^2$ are independently hydrogen, $C_1$–$C_{10}$-alkyl, $C_1$–$C_{10}$-alkoxy, $C_6$–$C_{10}$-aryl, $C_6$–$C_{10}$-arylozy, $C_2$–$C_{10}$-alkenyl, $C_7$–$C_{40}$-arylalkyl, $C_7$–$C_{40}$-alkylaryl, $C_8$–$C_{40}$-arylalkenyl or halogen, $R^3$ and $R^4$ are independently hydrogen or $C_1$–$C_{10}$-alkyl, $R^5$ and $R^6$ are independently $C_1$–$C_{10}$-alkyl, $R^7$ is 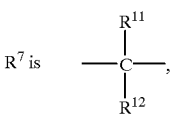, where $R^{11}$ and $R^{12}$ are independently hydrogen, halogen, $C_1$–$C_{10}$-alkyl, $C_1$–$C_{10}$-fluoroalkyl, $C_6$–$C_{10}$-aryl, $C_6$–$C_{10}$-fluoroaryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or $R^{11}$ and $R^{12}$ each form a ring with the atoms to which they are attached, $R^8$ and $R^9$ independently have the meanings stated for $R^{11}$, m is 1, and n is zero; and as another active component, an oligomeric aluminum oxide compound.

2. The process of claim 1, wherein $R^{11}$ and $R^{12}$ are independently hydrogen, $C_1$–$C_{10}$-alkyl or $C_6$–$C_{10}$-aryl, or $R^{11}$ and $R^{12}$ each form a ring with the atoms to which they are attached.

3. The process of claim 1, wherein $M^1$ is zirconium, $R^3$ and $R^4$ are independently hydrogen or methyl, $R^5$ and $R^6$ are each methyl, and

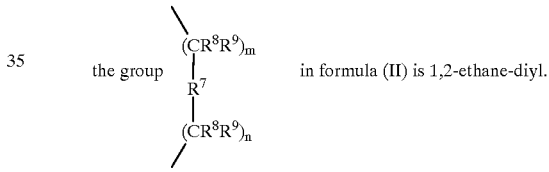

4. The process of claim 1, wherein the complex of formula (II) is rac[1,2-ethanediylbis{1-(4,7-dimethyl-4,5,6,7-tetrahydroindenyl)}] zirconium dichloride.

5. The process of claim 1, wherein the second catalyst system is a Ziegler-Natta catalyst system.

6. The process of claim 1, wherein the multiphase homo- or copolymers are prepared in the gas phase.

7. The process of claim 1, wherein the multiphase homo- or copolymers are prepared at from −20 to 100° C. and at from 1 to 80 bar.

8. The process of claim 1, wherein multiphase homopolymers of propylene are prepared.

* * * * *

UNITED STATES PATENT AND TRADEMARK OFFICE
CERTIFICATE OF CORRECTION

PATENT NO. : 6,197,900 B1  
DATED : March 6, 2001  
INVENTOR(S) : Seelert et al.

Page 1 of 1

It is certified that error appears in the above-identified patent and that said Letters Patent is hereby corrected as shown below:

<u>Column 11, claim 1,</u>  
Line 51, "$C_6$-$C_{10}$ -arylozy" should be -- $C_6$-$C_{10}$-aryloxy --.

Signed and Sealed this

Twenty-fifth Day of September, 2001

Attest:

NICHOLAS P. GODICI  
Attesting Officer Acting Director of the United States Patent and Trademark Office